(12) United States Patent
Szeto

(10) Patent No.: US 10,782,784 B2
(45) Date of Patent: Sep. 22, 2020

(54) MAGNETIC TACTILE FEEDBACK ACTUATOR HAVING ONE OR MORE ELECTROPERMANENT MAGNETS AND METHOD OF OPERATING SAME

(71) Applicant: NANOPORT TECHNOLOGY INC., Markham (CA)

(72) Inventor: Timothy Jing Yin Szeto, Mississauga (CA)

(73) Assignee: NANOPORT TECHNOLOGY INC., Markham (CA)

( * ) Notice: Subject to any disclaimer, the term of this patent is extended or adjusted under 35 U.S.C. 154(b) by 96 days.

(21) Appl. No.: 16/203,658

(22) Filed: Nov. 29, 2018

(65) Prior Publication Data

US 2019/0094976 A1 Mar. 28, 2019

Related U.S. Application Data

(63) Continuation-in-part of application No. PCT/CA2017/050756, filed on Jun. 21, 2017.
(Continued)

(51) Int. Cl.
*G06F 3/00* (2006.01)
*H01F 7/00* (2006.01)
(Continued)

(52) U.S. Cl.
CPC ............ *G06F 3/016* (2013.01); *G06F 3/0416* (2013.01); *H01F 7/064* (2013.01); *H01H 3/503* (2013.01);
(Continued)

(58) Field of Classification Search
CPC ........ H02K 33/00; H02K 33/02; H02K 33/16; H02K 33/18; H02K 41/03; H02K 41/031;
(Continued)

(56) References Cited

U.S. PATENT DOCUMENTS 9,716,423 B1 * 7/2017 Szeto ..................... H02K 33/16
2002/0114487 A1 * 8/2002 Maekawa .............. H04R 9/063
381/412
(Continued)

FOREIGN PATENT DOCUMENTS

CN 105723566 A 6/2016

*Primary Examiner* — Tran N Nguyen
(74) *Attorney, Agent, or Firm* — Norton Rose Fulbright Canada LLP; Reno Lessard

(57) ABSTRACT

There is described a tactile feedback actuator generally having a hammer path having a length extending between two opposite ends, a coil element fixedly mounted relative to the hammer path, a magnetic hammer guidingly mounted for movement along the hammer path. The magnetic hammer is electromagnetically engageable by a magnetic field emitted upon activation of the coil element so as to be longitudinally slid along the hammer path in any one of two opposite directions depending on a polarity of activation of the coil element. The tactile feedback actuator has at least one electropermanent magnet at at least one of the opposite ends of the hammer path, the electropermanent magnet having a magnetization direction aligned with the length of the hammer path, and at least one state toggling device configured for toggling a state of the electropermanent magnet between a magnetized state and an unmagnetized state.

21 Claims, 9 Drawing Sheets

Related U.S. Application Data

(60) Provisional application No. 62/641,699, filed on Mar. 12, 2018, provisional application No. 62/593,512, filed on Dec. 1, 2017.

(51) Int. Cl.
  *H02N 2/00* (2006.01)
  *G06F 3/01* (2006.01)
  *G06F 3/041* (2006.01)
  *H01F 7/06* (2006.01)
  *H01H 3/50* (2006.01)
  *H01H 3/00* (2006.01)

(52) U.S. Cl.
  CPC . *H01H 2003/008* (2013.01); *H01H 2003/506* (2013.01)

(58) Field of Classification Search
  CPC .. B06B 1/00; B06B 1/04; B06B 1/045; G06F 3/00; G06F 3/01; G06F 3/016; G06F 3/04; G06F 3/041; G06F 3/0416; G06F 3/02; G06F 3/03; G06F 3/036; B60K 37/06; G01C 21/36; H01H 3/00; H01H 3/50; H01H 3/503; H01F 7/00; H01F 7/06; H01F 7/064
  See application file for complete search history.

(56) References Cited

U.S. PATENT DOCUMENTS

| | | | |
|---|---|---|---|
| 2003/0034954 A1* | 2/2003 | Sakamaki | B60K 37/06 345/156 |
| 2008/0001484 A1* | 1/2008 | Fuller | H02K 33/16 310/15 |
| 2016/0085304 A1* | 3/2016 | Mistry | H01F 7/0252 345/184 |
| 2016/0226182 A1 | 8/2016 | Szeto | |

* cited by examiner

MAGNETIC TACTILE FEEDBACK ACTUATOR HAVING ONE OR MORE ELECTROPERMANENT MAGNETS AND METHOD OF OPERATING SAME

REFERENCE TO RELATED APPLICATIONS

This patent application is a continuation-in-part of International Application Serial No. PCT/CA2017/050,756, filed on Jun. 21, 2017, and claims priority of U.S. Provisional Application Ser. No. 62/593,512, filed on Dec. 1, 2017 and of U.S. Provisional Application Ser. No. 62/641,699, filed Mar. 12, 2018, the contents of which are hereby incorporated by reference.

FIELD

The improvements generally relate to the field of electronic devices and more specifically to tactile feedback actuators for use in electronic devices.

BACKGROUND

Mechanical actuators have been used in electronic devices to provide tactile (a form of haptic) feedback. Such actuators may be referred to as haptic actuators or tactile feedback actuators. Such tactile feedback may be used, for example, to simulate the feel of a mechanical button when a user interacts with an interface without a mechanical button, e.g., a touch pad or a touchscreen, or to generate a vibration alert. An example of a tactile feedback actuator is described in United States Patent Publication No. 2015/0349619.

Although existing tactile feedback actuators have been satisfactory to a certain degree, there remained room for improvement. For instance, there remained room for improvement in providing a tactile feedback actuator in which a magnetic hammer is controlled to perform a vibration, and in providing a tactile feedback actuator in which a magnetic hammer can be controlled selectively to provide either a vibration/silent mode or an audible mode.

SUMMARY

In an aspect, there is described a tactile feedback actuator. The tactile feedback actuator has a magnetic hammer guidingly mounted for movement along a hammer path extending between a first end and a second end, an electropermanent magnet at the first end, a state toggling device to toggle a state of the electropermanent magnet, and a coil element activatable to electromagnetically engage the magnetic hammer to accelerate the magnetic hammer along the hammer path towards the electropermanent magnet.

As described herein, when the electropermanent magnet is toggled in an unmagnetized state, it can act as a stopper to stop the movement of the magnetic hammer. The haptic effect so produced can be referred to as a click. Alternately, when the electropermanent magnet is toggled in a magnetized state, it can act as a damper to decelerate the magnetic hammer and change the direction of the magnetic hammer. The haptic effect so produced can be referred to as a thump.

There is also described a method including using the state toggling device to toggle the state of the electropermanent magnet so that the electropermanent magnet either acts as a stopper or as a damper, to replace a first haptic effect produced by the actuator on the go with a different, second haptic effect. The state of the electropermanent magnet can be retoggled to replace the second haptic effect back with the first haptic effect. In this way, the actuator can be transitioned between an inaudible mode of operation and an audible mode of operation, and vice versa, by toggling the state of the electropermanent magnet.

In accordance with one aspect, there is provided a tactile feedback actuator having a hammer path having a length extending between two opposite ends, a coil element fixedly mounted relative to the hammer path, a magnetic hammer guidingly mounted for movement along the hammer path, the magnetic hammer being electromagnetically engageable by a magnetic field emitted upon activation of the coil element so as to be longitudinally slid along the hammer path in any one of two opposite directions depending on a polarity of activation of the coil element, at least one electropermanent magnet at at least one of the opposite ends of the hammer path, the electropermanent magnet having a magnetization direction aligned with the length of the hammer path, and at least one state toggling device configured for toggling a state of the electropermanent magnet between a magnetized state and an unmagnetized state.

In accordance with another aspect, there is provided a method of operating a tactile feedback actuator with a controller, the tactile feedback actuator having a magnetic hammer guidingly mounted for movement along a hammer path, an electropermanent magnet at a first end of the hammer path, and a coil element, the method comprising: activating the coil element in a manner that the magnetic hammer is moved in back and forth sequences along the hammer path to produce a first haptic effect when the magnetic hammer is decelerated at the first end; and toggling a state of the electropermanent magnet to replace the first haptic effect with a different, second haptic effect, one of the first and second haptic effects including a strike of the magnetic hammer to produce a click.a computer-readable memory.

There are described embodiments of the tactile feedback actuator in which one electropermanent magnet is provided at either one or both of the ends of the hammer path. In some other embodiments, more than one electropermanent magnet can be provided at either one or both of the opposite ends of the hammer path.

It will be understood that the expression "computer" as used herein is not to be interpreted in a limiting manner. It is rather used in a broad sense to generally refer to the combination of some form of one or more processing units and some form of memory system accessible by the processing unit(s). Similarly, the expression "controller" as used herein is not to be interpreted in a limiting manner but rather in a general sense of a device, or of a system having more than one device, performing the function(s) of controlling one or more device such as an electronic device or an actuator for instance.

It will be understood that the various functions of a computer or of a controller can be performed by hardware or by a combination of both hardware and software. For example, hardware can include logic gates included as part of a silicon chip of the processor. Software can be in the form of data such as computer-readable instructions stored in the memory system. Wth respect to a computer, a controller, a processing unit, or a processor chip, the expression "configured to" relates to the presence of hardware or a combination of hardware and software which is operable to perform the associated functions.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
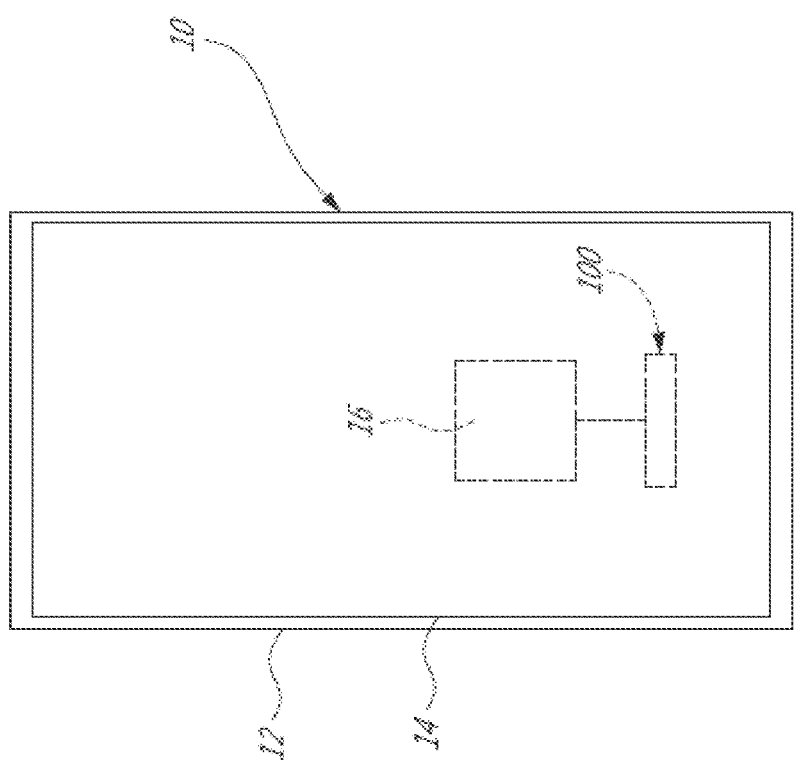
FIG. 1 is a top plan view of an example of an electronic device incorporating a tactile feedback actuator, in accordance with an embodiment.

FIG. 1 shows a first example of an actuator 100 that can be operated to provide tactile feedback.

As depicted, the actuator 100 can be included in a handheld electronic device 10 (e.g., a smartphone, a tablet, a remote control, etc.). The actuator 100 can also be used to provide vibration/buzzing/audible functions in the electronic device 10, in lieu of a conventional vibration generator (e.g., a piezoelectric actuator).

The electronic device 10 generally has a housing 12 to which a tactile input interface 14 is provided. For instance, the tactile input interface 14 can be a touch-sensitive sensor or pressure sensor (of capacitive or resistive types). The tactile input interface 14 can include a touch-screen display. As shown in this example, the housing 12 houses and encloses the actuator 100 and a controller 16. The controller 16 is in communication with the tactile input interface 14 and with the actuator 100. The controller 16 can be part of a computer of the electronic device 10 (e.g., its main computing processing unit (CPU)) and/or be provided in the form of a separate micro controller. It is noted that the electronic device 10 can include other electronic components such as ones found in conventional electronic devices. An example of an electronic device incorporating a pressure-sensitive user interface is described in PCT Patent Application No. PCT/CA2015/051110. U.S. Pat. No. 9,716,423 and PCT Patent Application PCT/CA2017/050756 describe embodiments of such tactile feedback actuator, the contents of which are incorporated herein by reference.

The controller 16 can be used to operate the actuator 100. For instance, during use, the tactile input interface 14 can receive a touch by a user which causes the interface 14 to transmit a signal to the controller 16 which, in turn, operates the actuator 100 to provide a tactile feedback, an audible feedback, or both, in response to the touch.

Figure 2:
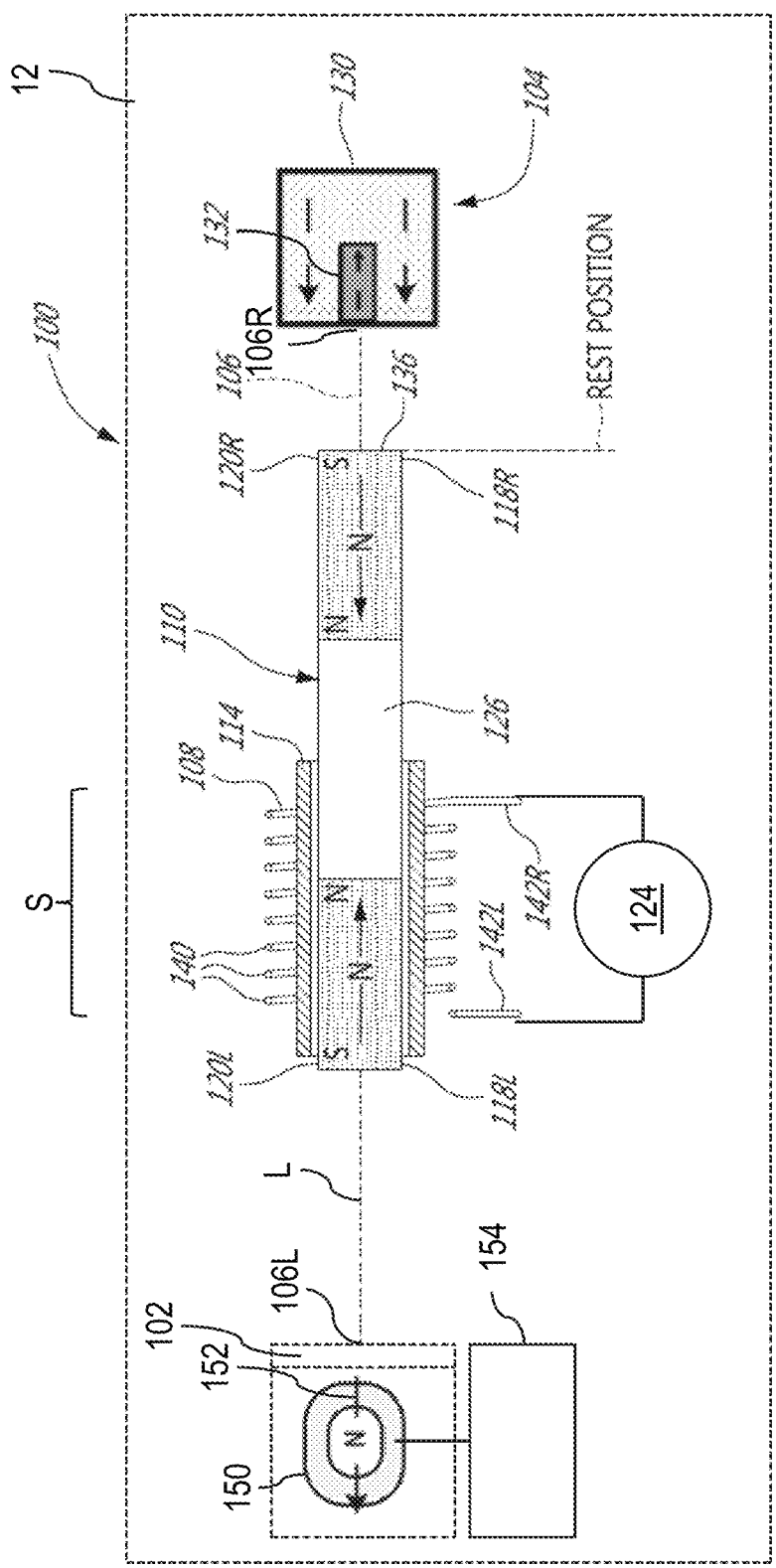
FIG. 2 is a top plan view of an example of the tactile feedback actuator of FIG. 1, in accordance with an embodiment.

FIG. 2 shows an example of the actuator 100. As depicted in this embodiment, the actuator 100 has a hammer path 106 having a length L extending between two opposite ends 106L,106R of the hammer path 106. The actuator has an electropermanent magnet 150 at the first end 106L and a damper at the second end 106R. As shown, the electropermanent magnet 150 has a magnetization direction 152 which is aligned with the length L of the hammer path 106. The actuator 100 has a coil element 108 being fixedly mounted relative to the hammer path 106 and a magnetic hammer 110 being guidingly mounted for movement along the hammer path 106.

As will be described herebelow, the magnetic hammer 110 is electromagnetically engageable by a magnetic field emitted upon activation of the coil element 108 so as to be longitudinally slid along the hammer path 106 in any one of two opposite directions depending on a polarity of activation of the coil element 108.

For instance, the magnetic hammer 110 may be longitudinally slid towards the electropermanent magnet 150 when the polarity of activation of the coil element 108 is positive (e.g., +5V) or longitudinally slid towards the damper 104 when the polarity of the activation of the coil element 108 is negative (e.g., −5V).

As described below with reference to FIG. 3, a toggling state device 154 is provided for toggling a state of the electropermanent magnet 150 between a magnetized state and an unmagnetized state.

As can be understood, when the electropermanent magnet 150 is in the unmagnetized state, no significant magnetic repelling can occur between the electropermanent magnet 150 and the magnetic hammer 110. Accordingly, when the magnetic hammer 110 is accelerated towards the electropermanent magnet 150, a first haptic effect can be produced as the magnetic hammer 110 is decelerated at the first end 106L of the hammer path 106.

In this specific embodiment, a stopper 102 is provided at the first end 106L of the hammer path 106. In some cases, the stopper 102 can be part of an internal frame or other mechanical support structure of the electronic device 10. In this embodiment, when the magnetic hammer 110 is accelerated towards the electropermanent magnet 150 and the electropermanent magnet 150 is in the unmagnetized state, the magnetic hammer 110 is slidable to strike the stopper 102, which stops the movement of the magnetic hammer 110 and produces the first haptic effect. The first haptic effect so produce can be referred to as a click.

In alternate embodiments, the stopper 102 is optional. Indeed, in these embodiments, the electropermanent magnet 150 delimits the first end 106L of the hammer path 106 and the magnetic hammer 110 is slidable to strike the electropermanent magnet 150 directly to produce the first haptic effect.

As can be understood, when the magnetic hammer 110 is accelerated towards the electropermanent magnet 150 and the electropermanent magnet 150 is in the unmagnetized state, the magnetic hammer 110 can be decelerated rather instantaneously due to the magnetic hammer 110 striking the stopper 102 or the electropermanent magnet 150.

However, when the electropermanent magnet 150 is in the magnetized state, magnetic attraction or repelling can occur between the electropermanent magnet 150 and the magnetic hammer 110. In this case, a second haptic effect being different from the first haptic effect can be produced as the magnetic hammer 110 is decelerated at the first end 106L of the hammer path 106.

For instance, if there is magnetic repelling between the electropermanent magnet 150 and the magnetic hammer 110, the electropermanent magnet 150 can decelerate the magnetic hammer 110 as it is longitudinally slid towards the electropermanent magnet 150 until the magnetic hammer 110 changes direction by "bouncing" without striking the electropermanent magnet 150. The haptic feedback so produced can be referred to as a thump.

In this example, due to the magnetic repelling between the electropermanent magnet 150 and the magnetic hammer 110, the magnetic hammer 110 changes direction before striking the stopper 102. Accordingly, the second haptic effect is different from the first haptic effect described above as there is no strike between the magnetic hammer 110 and the stopper 102. The second haptic effect can thus be considered to be inaudible as there is no audible sound of the magnetic hammer 110 striking the stopper 102.

Such magnetic repelling or attraction depends on the magnetization direction of the electropermanent magnet 150 and on the construction of the magnetic hammer 110.

More specifically, in this example, the magnetic hammer 110 has two permanent magnets 120L,120R of opposing polarities. The north pole of each of the two permanent magnets 120L,120R is provided inwardly towards middle segment 126 whereas the south pole of each of the two permanent magnets 120L,120R is provided outwardly from the middle segment 126. In such a configuration, the illustrated magnetization direction 152 of the electropermanent magnet 150 is such that it repels the permanent magnet 120L of the magnetic hammer 110 when the electropermanent magnet 150 is in the magnetized state. More specifically, the electropermanent magnet 150 can present a hammer-repelling pole that repels the magnetic pole of the permanent magnet 120L of the magnetic hammer 110 when the electropermanent magnet 150 is in the magnetized state.

In embodiments where there is magnetic attraction between the electropermanent magnet 150 and the magnetic hammer 110, the electropermanent magnet 150 can exert an additional magnetic force on the magnetic hammer 110, in addition to the magnetic force emitted upon activation of the coil element 108, so as to increase the momentum of the magnetic hammer 110 as it strikes the stopper 102, to provide a third haptic effect being different from the first haptic effect or the second haptic effect. More specifically, in this example, the third haptic effect can be similar to the first haptic effect, only with a greater strength.

As can be understood, notwithstanding the magnetization direction 152 of the electropermanent magnet 150 or the construction of the magnetic hammer 110, toggling the state of the electropermanent magnet 150 can thus replace the haptic effect produced when the magnetic hammer 110 is decelerated at the first end 106L of the hammer path 106 with another haptic effect.

Still referring to FIG. 2, the damper 104 has a first function of decelerating the magnetic hammer 110 as the magnetic hammer 110 is longitudinally slid towards the damper 104. Accordingly, a thump can be produced when the magnetic hammer 110 is decelerated by the damper 104 until the magnetic hammer 110 changes direction. The damper 104 can have a second function of providing a rest position to the magnetic hammer 110 wherein the magnetic hammer 110 is in a stable equilibrium along the hammer path 106 when the coil element 108 is deactivated. In this way, after the change of direction of the magnetic hammer 110, the magnetic hammer 110 can move towards the rest position, even when the coil element 108 is deactivated.

In this example, the damper 104 is provided in the form of a magnetic dampening assembly and can be referred to as "a magnetic dampening assembly 104". In this example, the magnetic dampening assembly 104 is adapted to achieve the two functions mentioned-above using magnetic dampening.

More specifically, the magnetic dampening assembly 104 has a ferromagnetic element 130 and a damper magnet 132 having a hammer-repelling pole. As will be understood, the permanent magnet 120R of the magnetic hammer 110 tends to attract the ferromagnetic element 130 when the magnetic hammer 110 approaches the magnetic dampening assembly 104. In contrast, the permanent magnet 120R of the magnetic hammer 110 tends to repel the hammer-repelling pole of the damper magnet 132 when the magnetic hammer 110 approaches the magnetic dampening assembly 104.

The ferromagnetic element 130 and the damper magnet 132 are arranged in a manner that in the absence of activation of the coil element 108, the overall magnetic forces imparted by the ferromagnetic element 130 and the damper magnet 132 on the magnetic hammer 110 i) mutually cancel out when a portion of the magnetic hammer 110 is at a rest position along the hammer path 106; ii) attract the magnetic hammer 110 when the portion of the magnetic hammer 110 is between the rest position and the stopper 102, and iii) repel the magnetic hammer 110 when the portion of the magnetic hammer 110 is between the rest position and the magnetic dampening assembly 104.

In this configuration, deactivating the coil element 108 may result in the magnetic hammer 110 moving towards the rest position. As can be understood, the electropermanent magnet 150 can contain ferromagnetic material that can attract the magnetic hammer 110 when the electropermanent magnet 150 is in the unmagnetized state. However, in the illustrated example, this magnetic attraction is not sufficient to pull the magnetic hammer 110 away from the rest position provided by the damper 104 as described above.

Many embodiments of the damper 104 can be provided, as described in the U.S. Pat. No. 9,716,423 and PCT Patent Application PCT/CA2017/050756. As described, some example dampers, such as the magnetic dampening assembly 104, achieve these functions using magnetic dampening only whereas some other example dampers achieve these functions using both magnetic dampening and mechanical dampening. More specifically, in the illustrated embodiment, both the first and second functions of the damper 104 can be achieved using magnetic dampening. However, in some other embodiments, the first function may be achieved using mechanical dampening, magnetic dampening, or both, whereas the second function may be achieved using only magnetic dampening. In yet other embodiments, both the first and second functions can be achieved using mechanical dampening.

As can be understood, the coil element 108 can be activated to move the magnetic hammer 110 in back and forth sequences along the hammer path 106. When the electropermanent magnet is in the unmagnetized state, the first haptic effect (e.g., click) is produced as the magnetic hammer 110 is decelerated at the first end 106L whereas a thump is produced as the magnetic hammer 110 is decelerated at the second end 106R, to produce a series of alternating clicks and thumps. By toggling the state of the electropermanent magnet 150 to the magnetized state, the second haptic effect (e.g., thump) is produced as the magnetic hammer 110 is decelerated at the first end 106L of the hammer path 106, to produce a series of successive thumps. As can be understood, the haptic effect so-produced by the actuator 100 can be replaced with another haptic effect by simply toggling the state of the electropermanent magnet 150.

The coil element 108 can be activated to cause the magnetic hammer 110 to maintain a certain frequency as it moves back and forth between the first and second ends 106L, 106R of the hammer path 106. Alternatively, the coil element 108 can be activated to cause the magnetic hammer 110 to increase in speed (and frequency) as it moves back and forth in resonance between the first and second ends 106L, 106R of the hammer path 106 until it reaches a maximum speed. For example, the coil element 108 can be driven at a signal duty cycle that increases the kinetic energy of the magnetic hammer 110 from one cycle to the next.

When the electropermanent magnet 150 is in the unmagnetized state, a first drive signal can cause the magnetic hammer 110 to strike the stopper 102 to produce a haptic effect with audible feedback while a second drive signal can cause the magnetic hammer 110 to move towards damper 104 to produce a haptic effect without audible feedback.

However, when the electropermanent magnet 150 is in its magnetized state, both the first and second drive signals would produce haptic effects without audible feedback. Accordingly, toggling on the state of the electropermanent magnet 150 through the above-noted control signal causes the actuator 100 to transition to an inaudible mode of operation (e.g., muting the actuator). Conversely, toggling off the state of the electropermanent magnet 150 can cause the actuator 100 to transition to an audible mode of operation with audible clicks available when the magnetic hammer 110 is driven towards the stopper 102.

Accordingly, toggling the state of the electropermanent magnet 150 can replace a first haptic effect with a different, second haptic effect and retoggling the state of the electropermanent magnet 150 can replace the second haptic effect back with the first haptic effect.

In this way, actuator 100 can be made to transition between audible and inaudible modes of operation, without need to change the drive signal. In some embodiments, the actuator 100 can be toggled from the audible mode to the inaudible mode upon the controller 16 receiving a request to transition the actuator 100 from the audible mode to the inaudible mode. Similarly, the actuator 100 can be toggled from the inaudible mode to the audible mode upon the controller 16 receiving a request to transition the actuator 100 from the inaudible mode to the audible mode. Such requests can originate from the electronic device 10 or any other external electronic device which can communicate with the controller 16.

In some embodiments, the electropermanent magnet 150, the stopper 102, the damper 104 and the coil element 108 are fixedly mounted to a housing 12. However, in some other embodiments, the electropermanent magnet 150, the stopper 102, the damper 104 and the coil element 108 are fixedly mounted to an interior of the electronic device 10.

The magnetic hammer 110 can be guidingly mounted relative to the coil element 108 differently depending on the embodiments. For instance, in the illustrated embodiment, a hammer path guide 114 is fixedly mounted relative to the stopper 102, the damper 104 and the coil element 108.

More specifically, the hammer path guide 114 is provided along the hammer path 106, within the coil element 108 and snugly around the magnetic hammer 110 to longitudinally guide the magnetic hammer 110 in either direction. In this embodiment, the hammer path guide 114 is provided in the form of a sleeve. In this example, the magnetic hammer 110 defines a hollow center cavity in which the magnetic hammer 110 is slidingly received. Any other suitable type of hammer path guide can be used. As described further below, such a hammer path guide can be omitted in some embodiments.

As illustrated, the coil element 108 is activatable by a signal source 124. The electromagnetic engagement between the coil element 108 and the magnetic hammer 110 is described in the following paragraphs.

More specifically, the magnetic hammer 110 has two opposite ends 118L,118R. Each end 118L,118R of the magnetic hammer 110 has a corresponding one of the two permanent magnets 120L,120R. As depicted, the permanent magnet 120L is provided proximate to the stopper 102 and the permanent magnet 120R is provided proximate to the damper 104.

For clarity, in this disclosure, it will be noted that reference numerals identified with the letter L will refer to elements shown at the left-hand side of the page whereas the letter R will refer to elements shown at the right-hand side of the page. For instance, the permanent magnet 120L refers to a first one of the two permanent magnets and is shown at the left hand side of the page. Similarly, the permanent magnet 120R refers to a second one of the two permanent magnets and is shown at the right-hand side of the page. This nomenclature will apply to other components of the actuator 100.

As discussed above, the two permanent magnets 120L, 120R have opposing polarities. For ease of understanding, north and south poles of such permanent magnets are identified with corresponding tags N or S. As will be described below, the two permanent magnets 120L, 120R have opposing polarities such that their magnetic poles form an S—N—N—S arrangement or an N—S—S—N arrangement along the magnetic hammer 110.

Each permanent magnet 120L,120R can include one or more permanent magnet units each sharing a similar polarity orientation. For instance, the permanent magnet 120L can include two permanent magnet units arranged such that the north pole of one of the two permanent magnet units be abutted on a south pole of the other one of the two permanent magnet units. Each permanent magnet 120L,120R can be made from a rare earth material, such as Neodymium-Iron-Boron (NdFeB), Samarium-cobalt, or from iron, nickel or any suitable alloys.

As can be seen, the middle segment 126 separates the two permanent magnets 120L,120R. The middle segment 126 can be made from a ferromagnetic material or from any other suitable material.

Still referring to the embodiment illustrated in FIG. 2, the portion of the magnetic hammer 110 is defined as a tip 136 of the permanent magnet 120R. However, the portion can be any reference part of the permanent magnet 120R proximate to the magnetic dampening assembly 104.

In some embodiments, the ferromagnetic element 130 of the magnetic dampening assembly may include an unmagnetized ferromagnetic material. For instance, the ferromagnetic element 130 may be made of steel. Other suitable unmagnetized ferromagnetic material may apply.

However, in some embodiments, the ferromagnetic element 130 of the magnetic dampening assembly 104 can be replaced, partially or wholly, by a permanent magnet (referred to as "an attractor magnet") having a hammer-attracting pole. In these embodiments, the attractor magnet and the damper magnet 132 have permanently-aligned poles of opposing polarities. Each of the attractor and damper magnets may be made from a rare earth material, such as Neodymium-Iron-Boron (NdFeB), Samarium-cobalt, or from iron, nickel or suitable alloys. It is noted that using the attractor magnet instead of an unmagnetized ferromagnetic material can help decrease the size of the ferromagnetic element 130 and/or can allow to position the ferromagnetic element 130 farther from the magnetic hammer 110, which may be convenient.

In this example, the ferromagnetic element 130 is substantially larger than the damper magnet 132 such that the net effect of the magnetic fields emanating from the magnetic dampening assembly 104 is to attract the permanent magnet 120R of the magnetic hammer 110 and cause the magnetic hammer 110 to move towards the magnetic dampening assembly 104 when the tip 136 of the magnetic hammer 110 is between the stopper 102 and the rest position. However, when the magnetic hammer 110 is pulled sufficiently close to the magnetic dampening assembly 104 (between the rest position and the magnetic dampening assembly 104), the repelling force of the damper magnet 132 exerted on the permanent magnet 120R of the magnetic hammer 110 cancels out the attractive force between the ferromagnetic element 130 and the permanent magnet 120R of the magnetic hammer 110. In between, the magnetic hammer 110 is in a stable equilibrium at the rest position. A similar effect can be achieved with an attractor magnet that is a stronger magnet than the damper magnet, for instance.

In this example, the magnetic hammer 110 and the magnetic dampening assembly 104 are aligned with one another and substantially parallel to the hammer path 106.

The middle segment 126 of the magnetic hammer 110 is optional. For instance, in an embodiment where the middle segment 126 is omitted, the two permanent magnets 120L, 120R are fastened together with sufficient strength to overcome the repelling forces between them.

As shown, the coil element 108 includes a plurality of turns or windings 140 of a conductive wire of a given diameter which wrap around the hammer path guide 114. The coil element 108 includes two wire ends 142L,142R to which is connected the signal source 124. In some embodiments, the coil element 108 includes 200-500 turns of 0.2 mm gauge insulated copper wire. In these embodiments, the hammer path guide 114 is provided in the form of a sleeve having an outer diameter of about 3.2 mm and the hollow center cavity 116 has an inner diameter of about 3 mm.

In the embodiment shown, the two permanent magnets 120L,120R have a cylindrical shape of a length Lm of 6 mm and a diameter just under 3 mm (sized to fit through the hollow center cavity 116 of the hammer path guide 114). Still in this embodiment, the middle segment 126 has a cylindrical shape of a length of 7 mm and a diameter similar to the one of the two permanent magnets 120L,120R. It will be understood that people of ordinary skill in the art can choose alternate dimensions for alternate embodiments.

The lengths of the two permanent magnets 120L,120R and of the middle segment 126 can be selected in dependence of the span S of windings 140 of the coil element 108 as shown in FIG. 2. It is understood that the magnetic hammer 110 is positioned such that when the permanent magnet 120L abuts on the stopper 102, the permanent magnet 120L is positioned so as to be attracted/pulled by the coil element 108 towards the center of the span S (to the right), and permanent magnet 120R is positioned so as to be repelled/pushed towards the magnetic dampening assembly 104. Similarly, when the magnetic hammer 110 is positioned at the rest position proximate to the magnetic dampening assembly 104, the permanent magnet 120R is positioned so as to be attracted/pulled by the coil element 108 towards the center of the span S, and the permanent magnet 120L is positioned so as to be repelled/pushed towards the stopper 102 when the coil element 108 is activated in the opposite polarity.

In some embodiments, the stopper 102 includes ferromagnetic material so as to provide an additional rest position, in which case the permanent magnet 120L of the magnetic hammer 110 can be attracted to the ferromagnetic material of the stopper 102. This additional rest position may function similarly to the "second rest position" described in the '756 application. In these embodiments, toggling the state of the electropermanent magnet 150 in the magnetized state can be used to push the magnetic hammer 110 off the second rest position. In some other embodiments, ferromagnetic material of the electropermanent magnet 150 is used to provide the second rest position.

The magnetic field produced by the coil element 108 depends on the output of the signal source 124, which governs the direction and amplitude of current flow in the coil element 108. Of interest is the direction of the magnetic field lines of the coil element 108 and the effect on the magnetic hammer 110 as to whether it repels or attracts corresponding ones of the two permanent magnets 120L, 120R.

The coil element 108 can be activated by applying a given voltage V to the wire ends 142L,142R via the signal source 124. When activated, the coil element 108 forms an electromagnet having a given magnetic polarity with north (N) and south (S) poles at opposing sides of the coil element 108. This given magnetic polarity can be inverted by inverting the voltage V applied to the wire ends 142L,142R.

In other words, changing the polarity of the voltage applied by the signal source 124 is equivalent to inverting the flow direction of the electrical current I along the conductive wire of the coil element 108, and to inverting the polarity of the electromagnet.

For ease of reading, in the following paragraphs, the activation of the coil element 108 to move the magnetic hammer 110 to the left can be referred to as "activation with a first polarity" whereas the activation of the coil element 108 to move the magnetic hammer 110 to the right can be referred to as "activation with a second polarity". The first polarity being opposite to that of the first polarity.

Figure 2B:
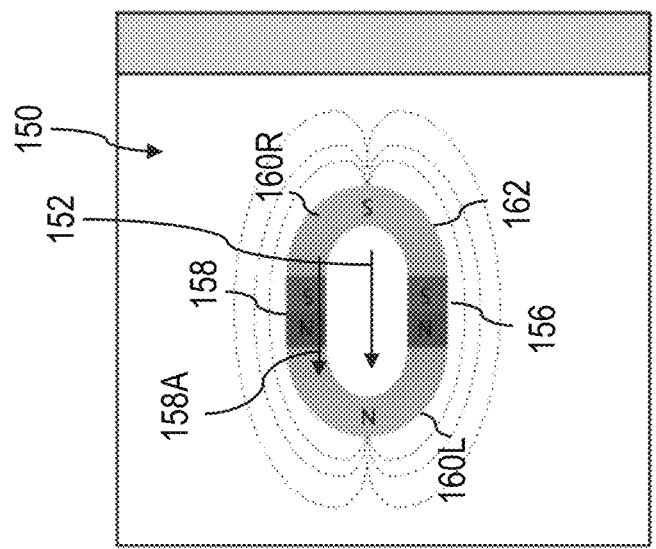
FIG. 2B is a top plan view of an electropermanent magnet of the tactile feedback actuator of FIG. 2, showing exemplary magnetic field lines therearound when the electropermanent magnet is in a magnetized state.
Figure 2A:
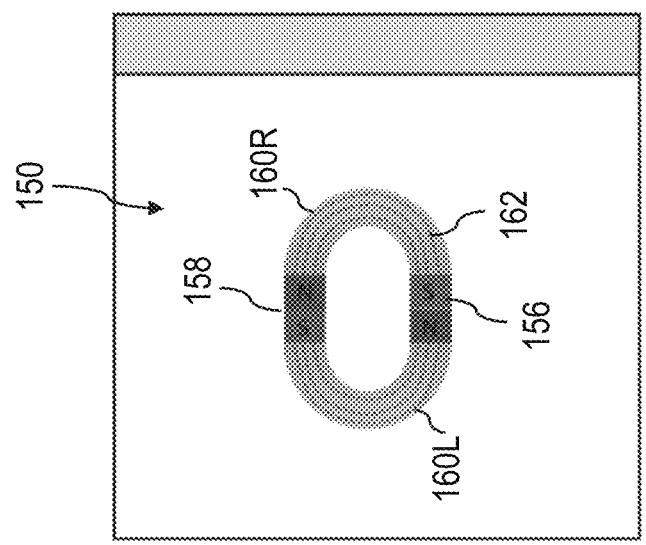
FIG. 2A is a top plan view of an electropermanent magnet of the tactile feedback actuator of FIG. 2, showing absence of exemplary magnetic field lines therearound when the electropermanent magnet is in an unmagnetized state.

FIGS. 2A and 2B show magnetic field lines of the electropermanent magnet 150 as a function of the state in which the electropermanent magnet 150 is toggled.

As shown in this example, the electropermanent magnet 150 includes a first permanent magnet 156, a second permanent magnet 158 and two U-shaped ferromagnetic members 160L,160R. The first permanent magnet 156, the second permanent magnet 158 and the U-shaped ferromagnetic members 160L,160R are configured such as to form an O-shaped member 162, as illustrated.

FIG. 2A shows magnetic field lines of the electropermanent magnet 150 when in the unmagnetized state. As depicted, the first permanent magnet 156 has a north pole on the left and a south pole on the right, and the second permanent magnet 158 has a south pole on the left and a north pole on the right. Accordingly, magnetic field lines exiting the north pole of the first permanent magnet 156 follows the U-shaped path of the first U-shaped ferromagnetic members 160L to reach the south pole of the second permanent magnet 158. Similarly, magnetic field lines exiting the north pole of the second permanent magnet 158 follows the U-shaped path of the second U-shaped ferromagnetic members 160R to reach the south pole of the first permanent magnet 156.

As a consequence, the magnetic field lines of the first and second permanent magnets 156 and 158 are kept inside the U-shaped ferromagnetic members 160L,160R (because the high permeability of the ferromagnetic members) when it is toggled in the unmagnetized state, so as to produce no significant exterior magnetic field. As can be understood, in such a state, the electropermanent magnet 150 cannot repel the magnetic hammer 110.

FIG. 2B shows magnetic field lines of the electropermanent magnet 150 when in the magnetized state. As shown in this example, toggling the state of the electropermanent magnet 150 inverses a magnetization direction of the second permanent magnet 158. Accordingly, the north pole of the second permanent magnet 158 is now on the left, and the south pole of the second permanent magnet 158 is now on the right. As a result, the magnetization orientation of both the first and second permanent magnets 156 and 158 are in the same direction so the first U-shaped ferromagnetic member 160L forms a north pole whereas the second U-shaped ferromagnetic member 160R forms a south pole. In this state, exterior magnetic field lines exit the first U-shaped ferromagnetic member 160L towards the south pole of the second U-shaped ferromagnetic member 160R and form an external magnetic field which can attract or repel the magnetic hammer 110.

As illustrated, magnetic field lines of the so-formed magnetic field define the magnetization direction 152 of the electropermanent magnet 150 when it is toggled in the magnetized state. As can be understood, depending on the magnetization direction of the electropermanent magnet 150 and on the construction of the magnetic hammer 110, the electropermanent magnet 150 can either attract or repel the magnetic hammer 110.

The state toggling device 154 is thus configured to toggle the state of the electropermanent magnet 150 by inversing the magnetization direction of at least the second permanent magnet 158 in this example, which forces an external magnetic field to be either formed or canceled.

Figure 3:
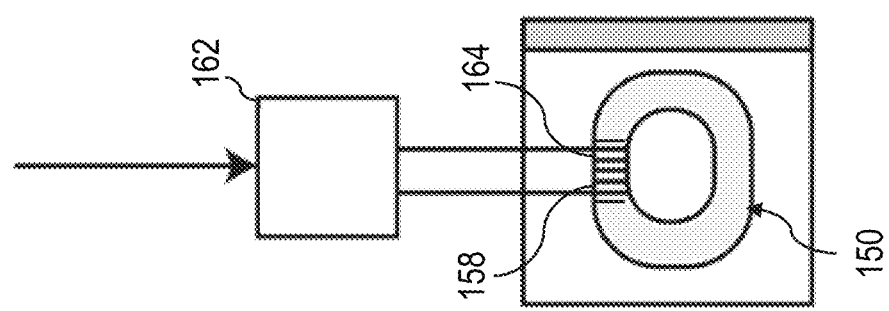
FIG. 3 is a top plan view of an example of a state toggling device used to toggle the state of the electropermanent magnet of the tactile feedback actuator of FIG. 2 between a magnetized state and an unmagnetized state.

FIG. 3 shows an example of the state toggling device 154. In this specific embodiment, the state toggling device 154 includes a pulse generator 162 electrically connected to a wire winding 164 wrapped around part of the second permanent magnet 158.

In this example, the pulse generator 162 receives a control signal 166 from the controller 16 (shown in FIG. 1) or other controller circuitry of the electronic device 10, and is configured to, upon receiving a corresponding control signal 166, inject a pulse of current into the wire winding 164 which causes the magnetization direction of the second permanent magnet 158 to be reversed. The pulse of current has sufficient amplitude and duration, and is of a selected polarity, to toggle the state of the electropermanent magnet. This can happen when the magnetic field generated by propagating the pulse of current in the wire winding 164 and inside the second permanent magnet 158 is higher than an intrinsic coercivity $H_{ci}$ of the second permanent magnet 158.

Applying the same pulse of current in an opposite direction will lead to magnetize the second permanent magnet 158 in the opposite direction, and vice versa. Accordingly, the state of the electropermanent magnet 150 can be toggled between the magnetized state and the unmagnetized state by injecting a pulse of current in one of two directions along the wire winding 164 based on a control signal received from the controller 16.

It is important to mention that both the first and second permanent magnets 156 and 158 can be wound in the same wire winding 164. In this case, one of the first and second permanent magnets 156 and 158 has to have much lower intrinsic coercivity than the other one in order to flip their magnetization direction without changing the other's magnetization direction.

Of notice, unlike an electromagnet, the electropermanent magnet does not require an electric current to maintain its magnetic field; rather, energy is required only to toggle the state. Indeed, after toggling the state of the electropermanent magnet no current is needed and the field will return to depends on the permanent magnets.

In this embodiment, the first permanent magnet 156 is made of NdFeB and the second permanent magnet 158 is made of AlNiCo. Both of these materials have the same remanence (around 1.3T) but AlNiCo has a lower intrinsic coercivity of 50 kA/m while NdFeB has an intrinsic coercivity of 1120 kA/m.

Other embodiments of the state toggling device 154 can be provided. For instance, in some other embodiments, the second permanent magnet 158 is rotatable about itself, and the state toggling device includes a rotating actuator for rotating the second magnet 156 based on a control signal which causes the state of the electropermanent magnet 150 to be toggled.

The following paragraphs describe that the haptic effect provided by actuator 100 can be replaced from one type of haptic effect to another by toggling the state of the electropermanent magnet 150.

Figure 4:
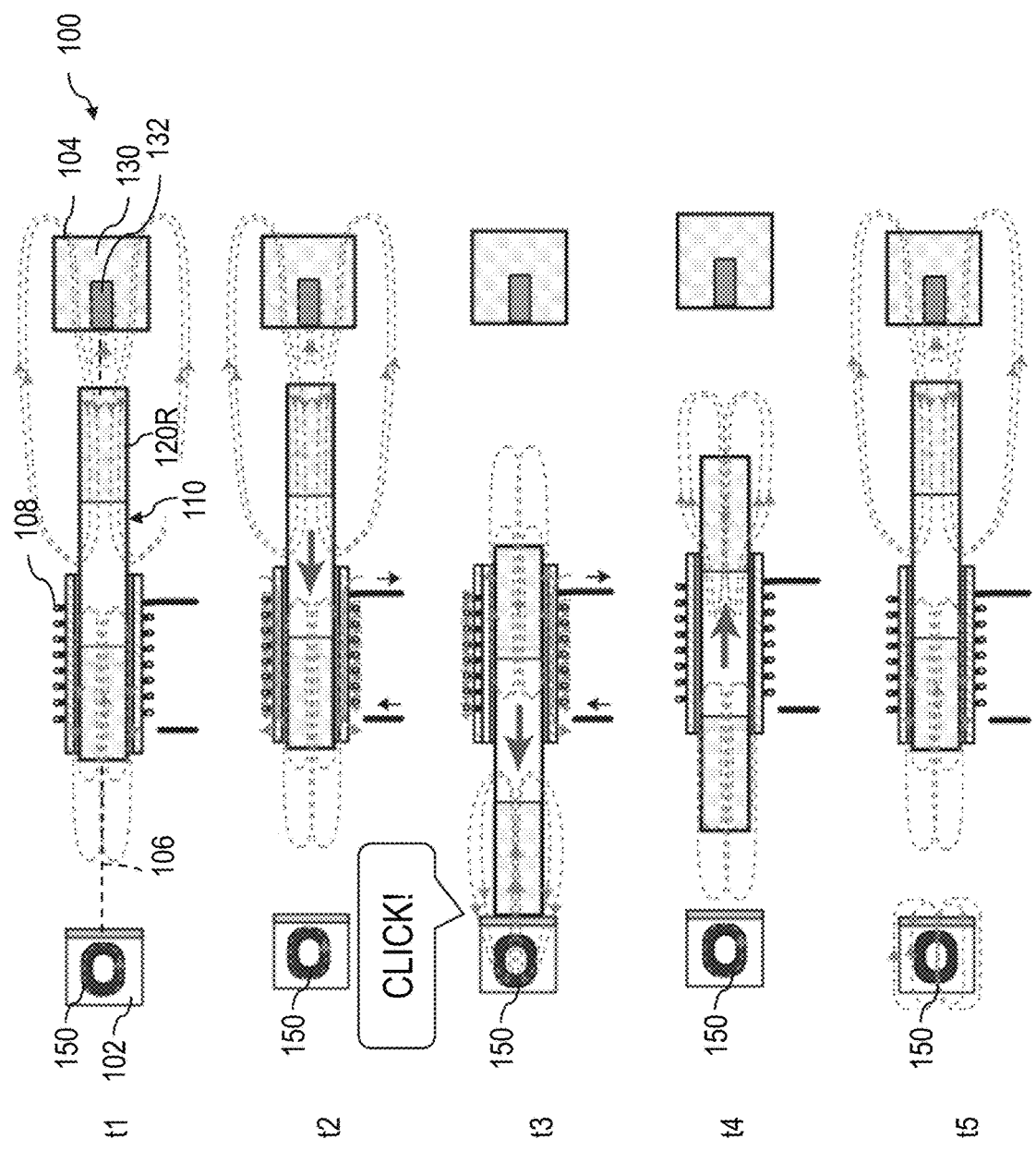
FIG. 4 shows cross-sectional views of the tactile feedback actuator of FIG. 2 taken at different moments in time during a swing to the left of the magnetic hammer when the electropermanent magnet is in an unmagnetized state.

More specifically, FIG. 4 include a snapshot at different moments in time t1 to t5 during a movement sequence to produce a first haptic effect including a click, wherein t5>t4>t3>t2>t1. As shown, the electropermanent magnet 150 is toggled in the unmagnetized state in this sequence.

At moment in time t1, the magnetic hammer 110 is in the rest position. At this stage, the coil element 108 is not activated. The repelling force of the damper magnet 132 exerted on the permanent magnet 120R of the magnetic hammer 110 cancels out the attractive force between the ferromagnetic element 130 and the permanent magnet 120R of the magnetic hammer 110. There is thus both a magnetic attraction between the permanent magnet 120R and the ferromagnetic element 130, and a magnetic repelling between the permanent magnet 120R and the damper magnet 132 which maintains the magnetic hammer 110 in the rest position.

To initiate the movement of the magnetic hammer 110 in this sequence, the controller activates the coil element 108 by a voltage of the first polarity (e.g., +5V) to the coil element 108 via the signal source 124 in a manner to generate a magnetic force between the coil element 108 and the magnetic hammer 110. Such activation of the coil element 108 is maintained for the moments in time t2 and t3.

At moment in time t2, the activation of the coil element 108 causes acceleration of the magnetic hammer 110 from the rest position to a given velocity towards the electropermanent magnet 150. At this point, the activation of the coil element 108 attracts the permanent magnet 120R and repels the permanent magnet 120L towards the electropermanent magnet 150.

At moment in time t3, the activation of the coil element 108 still causes the coil element 110 to attract the permanent magnet 120R and repel the permanent magnet 120L towards the electropermanent magnet 150. Prior to the magnetic hammer 110 striking the stopper 102, the coil element 108 is deactivated, however, the momentum carried by the moving magnetic hammer 110 still causes the magnetic hammer 110 to move towards the electropermanent magnet 150. The strike between the magnetic hammer 110 and the stopper 102 decelerates the magnetic hammer 110 to a complete stop which produces the first haptic effect, including a click.

At moment in time t4, the coil element 108 is deactivated, which causes the magnetic hammer 110 to move back to the rest position due to the magnetic attraction between the magnetic hammer 110 and the damper 104.

At moment in time t5, the magnetic hammer 110 is back at the rest position.

Operation of the actuator 100 as shown in FIG. 4 can create a click including both a tactile feedback and an audible feedback. For instance, the click can be provided in response to press of a button on a touchscreen of an electronic device including actuator 100. The strike of the magnetic hammer 110 against the stopper 102 can be audible, e.g., to simulate the sound of a button being depressed (e.g., a click). Accordingly, the click may be felt and heard.

Figure 5:
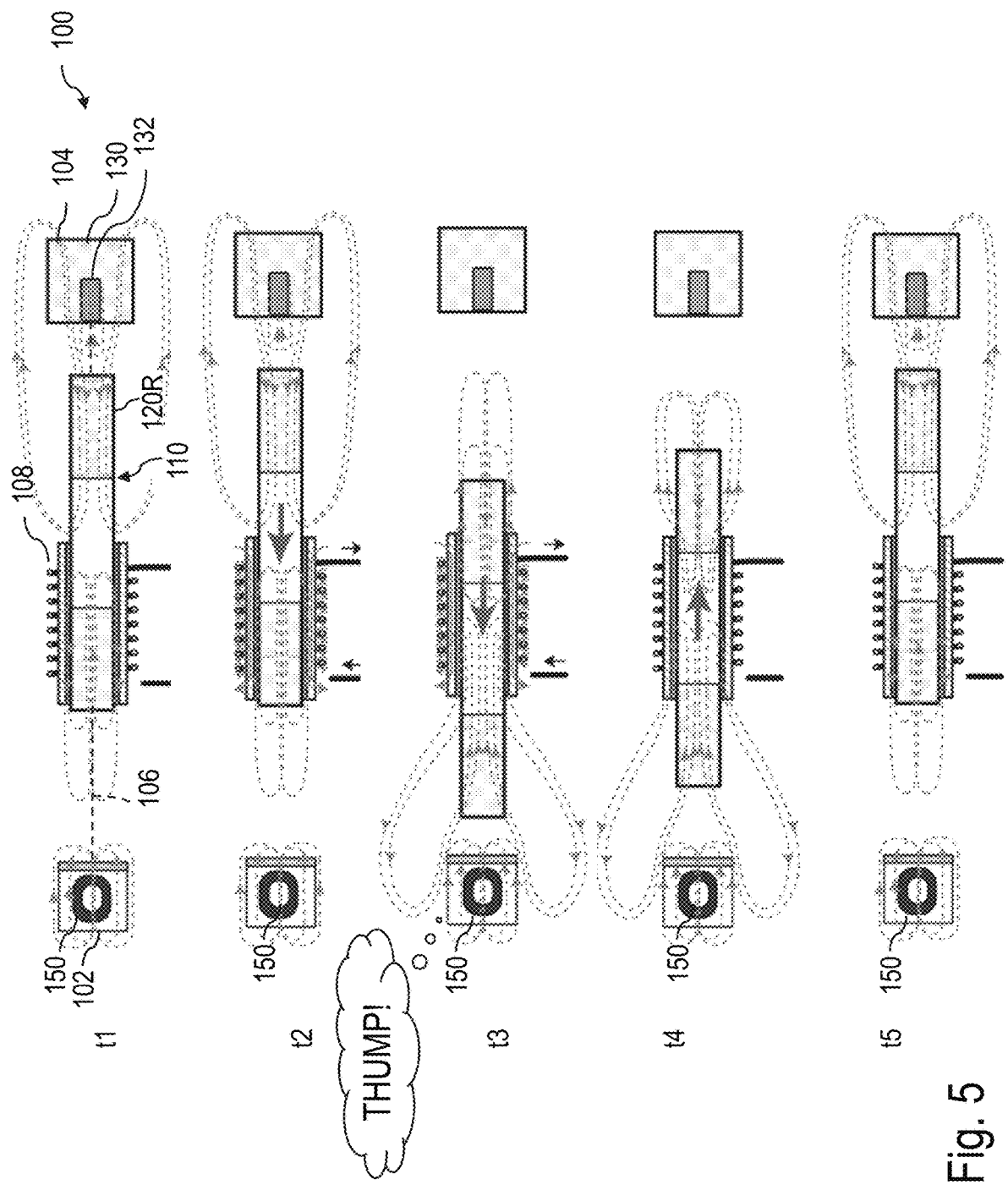
FIG. 5 shows cross-sectional views of the tactile feedback actuator of FIG. 2 taken at different moments in time during a swing to the left of the magnetic hammer when the electropermanent magnet is in a magnetized state.

FIG. 5 include a snapshot at different moments in time t1 to t5 during a movement sequence to produce a second haptic effect, wherein t5>t4>t3>t2>t1. As shown, the state of the electropermanent magnet 150 has been toggled in the magnetized state in this sequence.

At moment in time t1, the magnetic hammer 110 is in the rest position. At this stage, the coil element 108 is not activated.

To initiate the movement of the magnetic hammer 110 in this sequence, the controller activates the coil element 108 by a voltage of the first polarity (e.g., +5V) to the coil element 108 via the signal source 124 in a manner to generate a magnetic force between the coil element 108 and the magnetic hammer 110. Such activation of the coil element 108 is maintained for the moments in time t2 and t3.

At moment in time t2, the activation of the coil element 108 causes acceleration of the magnetic hammer 110 from the rest position to a given velocity towards electropermanent magnet 150. At this point, the activation of the coil element 108 attracts the permanent magnet 120R and repels the permanent magnet 120L towards the electropermanent magnet 150.

At moment in time t3, the activation of the coil element 108 still causes the coil element 110 to attract the permanent magnet 120R and repel the permanent magnet 120L towards the electropermanent magnet 150. Prior to the magnetic hammer 110 reaching the electropermanent magnet 150, the coil element 108 is deactivated, however, the momentum carried by the moving magnetic hammer 110 still causes the magnetic hammer 110 to move towards the electropermanent magnet 150.

As can be understood, due to the magnetic repelling between the electropermanent magnet 150 in the magnetized state and the magnetic hammer 110, the magnetic hammer 110 is decelerated as it is longitudinally slid towards the electropermanent magnet 150, to produce the second haptic effect such as a thump.

At moment in time t4, the coil element 108 is deactivated and the magnetic hammer 110 moves back to the rest position due to the magnetic attraction between the magnetic hammer 110 and the damper 104.

At moment in time t5, the magnetic hammer 110 is back at the rest position.

Operation of the actuator 100 as shown in FIG. 5 can create a thump including a tactile feedback. For instance, the thump can be provided in response to press of a button on a touchscreen of an electronic device including the actuator 100. The movement of the magnetic hammer 110 is dampened by the electropermanent magnet 150 in the magnetized state, and the magnetic hammer 110 does not strike the electropermanent magnet 150. Accordingly, the thump may be felt, but not heard.

In some embodiments, the thump (i.e. the vibration) can be weaker than the click. This may be desirable if an electronic device is in a silent mode, or for providing feedback that is less intrusive.

Figure 6:
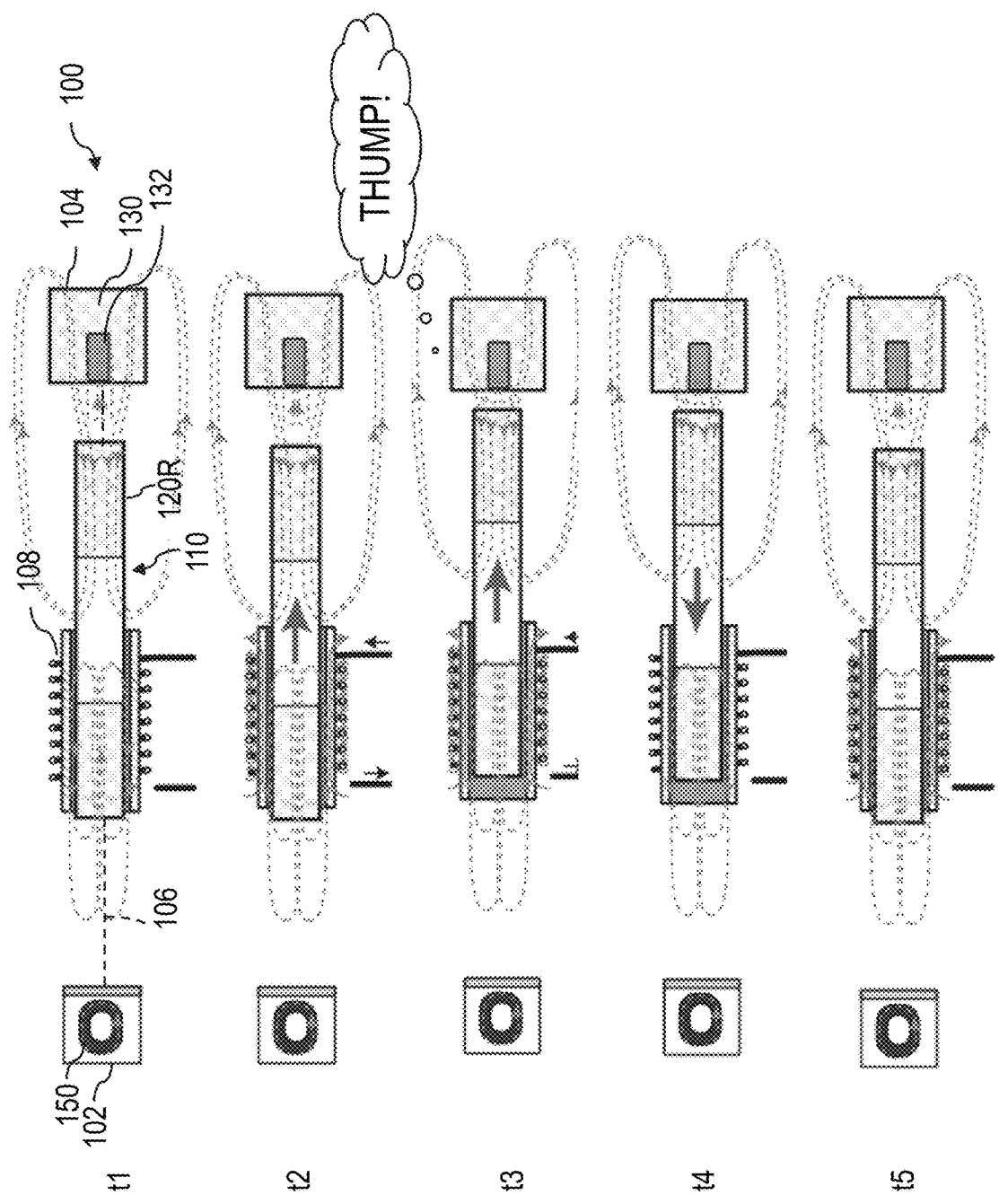
FIG. 6 shows cross-sectional views of the tactile feedback actuator of FIG. 2 taken at different moments in time during a swing to the right of the magnetic hammer towards a damper.

FIG. 6 shows an example of a movement sequence of the magnetic hammer 110 wherein the magnetic hammer 110 initially rests at the rest position proximate the damper 104, moves rightward towards the damper 104, in response to the activation of the coil element 108, and is repelled back to the rest position by the damper 104 when the coil element 108 is deactivated.

More specifically, FIG. 6 include a snapshot at different moments in time t1 to t5 during the movement sequence wherein t5>t4>t3>t2>t1. As shown, at moment in time t1, the magnetic hammer 110 is in the rest position. At this stage, the coil element 108 is not activated.

To initiate the movement of the magnetic hammer 110 in this sequence, the controller activates the coil element 108 by a voltage of a second polarity (e.g., −5V) to the coil element 108 via the signal source 124 in a manner to generate a magnetic force between the coil element 108 and the magnetic hammer 110. Such activation of the coil element 108 is maintained for the moments in time t2 and t3.

At moment in time t2, the activation of the coil element 108 causes acceleration of the magnetic hammer 110 from the rest position to a given velocity towards the damper 104. At this point, the activation of the coil element 108 attracts the permanent magnet 120L and repels the permanent magnet 120R towards the damper 104.

At moment in time t3, the activation of the coil element 108 still causes the coil element 110 to attract the permanent magnet 120L and repel the permanent magnet 120R towards the damper 104. However, the magnetic repelling between the damper magnet 132 of the damper 104 and the permanent magnet 120R causes the magnetic hammer 110 to decelerate, eventually at a null speed, to avoid striking the damper 104.

At moment in time t4, the tip 136 of the magnetic hammer is between the rest position and the damper 104 and the magnetic repelling between the damper magnet 132 and the permanent magnet 120R causes the magnetic hammer 110 to "bounce" without striking the damper 104 and to move towards the rest position, even when the coil element 108 is deactivated. The haptic feedback so produced can be referred to as a thump. In this way, a tactile feedback is produced but no audible feedback is produced.

At moment in time t5, the magnetic hammer 110 returns to the rest position wherein the magnetic attraction between the permanent magnet 120R and the ferromagnetic element 130 and the magnetic repelling between the permanent magnet 120R and the damper magnet 132 both maintain the magnetic hammer 110 at the rest position.

Although the actuator 100 is shown with a single electropermanent magnet, it is contemplated that the actuator 100 can have more than one electropermanent magnet at each one of the two opposite ends 106L,106R of the hammer path 106. Examples of which are described below.

Figure 7:
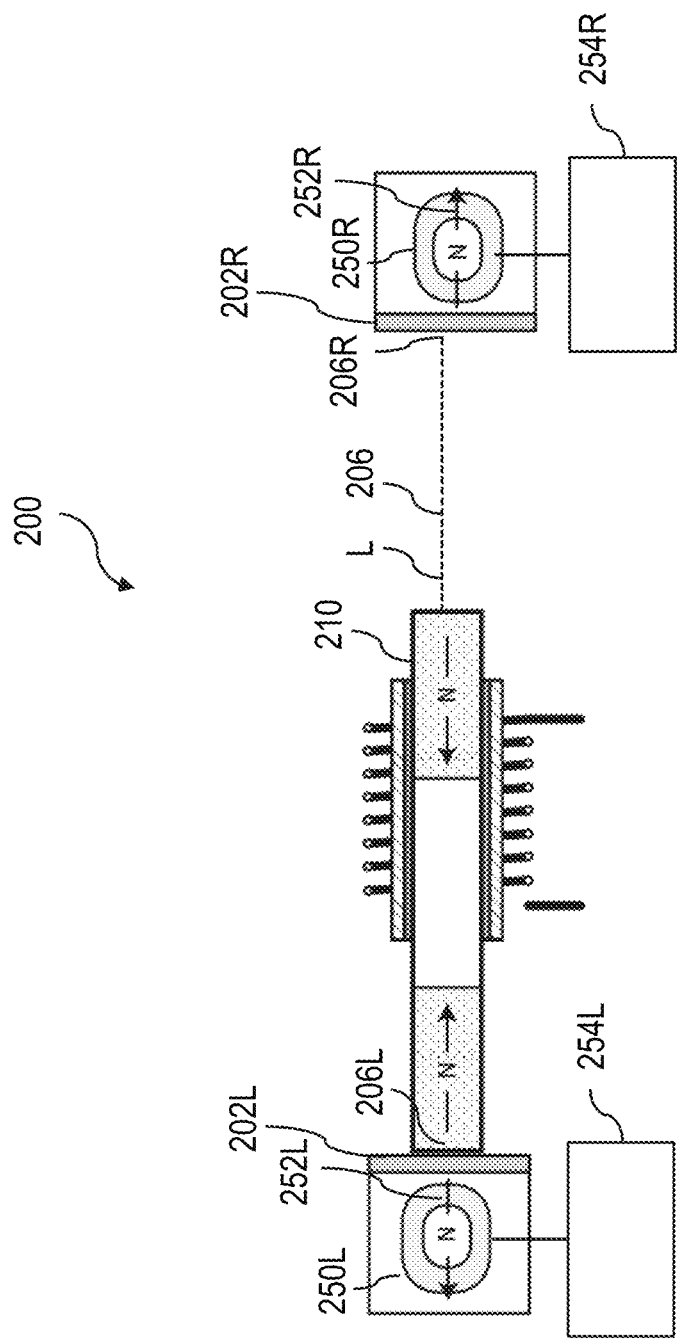
FIG. 7 is a top plan view of another example of the tactile feedback actuator of FIG. 1, showing one electropermanent magnet at each end of a hammer path of the tactile feedback actuator, in accordance with an embodiment.

FIG. 7 shows another example of an actuator 200, in accordance with another embodiment. As depicted, the actuator 200 has a hammer path 206 having a length L extending between first and second ends 206L,206R of the hammer path 206, a first electropermanent magnet 250L at the first end 206L and a second electropermanent magnet 250R at the second end 206R.

As shown, the first and second electropermanent magnets 250L,250R have magnetization directions 252L,252R which are aligned with the length L of the hammer path 206. Both first and second electropermanent magnets 250L,250R are configured to as to repel a corresponding one of the permanent magnets of the magnetic hammer 210 when in the magnetized state. However, the magnetization directions of the first and second electropermanent magnets 250L,250R arranged differently in some other embodiments.

In this example, to toggle the state of the first electropermanent magnet 250L, a first state toggling device 254L is provided. Similarly, a second state toggling device 254R is provided to toggle the state of the second electropermanent magnet 250R.

In this example, the first and second state toggling devices 254L and 254R are independent from one another. Accordingly, the states of the first and second electropermanent magnets 250L and 250R can be selectively controlled in an independent manner.

In some other embodiments, the states of the first and second electropermanent magnets 250L and 250R are controllable via a single state toggling device.

As can be understood, the actuator 200 can produce a series of clicks upon moving the magnetic hammer 210 in back and forth sequences, when the states of the first and second electropermanent magnets 250L,250R are both in an unmagnetized state.

Similarly, the actuator 200 can produce a series of thumps upon moving the magnetic hammer 210 in back and forth sequences, when the states of the first and second electropermanent magnets 250L,250R are both in a magnetized state.

When the first electropermanent magnet 250L is in the magnetized state and the second electropermanent magnet 250R is in the unmagnetized state, a series of alternating clicks and thumps can be produced upon moving the magnetic hammer 210 in back and forth sequences along the hammer path 206.

As shown, a first stopper 202L is provided at the first end 206L of the hammer path 106, between the first electropermanent magnet 250L and the magnetic hammer 210. Similarly, a second stopper 202R is provided at the second end 206R of the hammer path 206, between the magnetic hammer 210 and the second electropermanent magnet 250L.

As discussed above, ferromagnetic material of each one of the first and second electropermanent magnets 250L,250R can be used to provide respective rest positions. Alternately or additionally, each one of the first and second stoppers 202L,202R can include additional ferromagnetic material to provide these respective rest positions.

Figure 8:
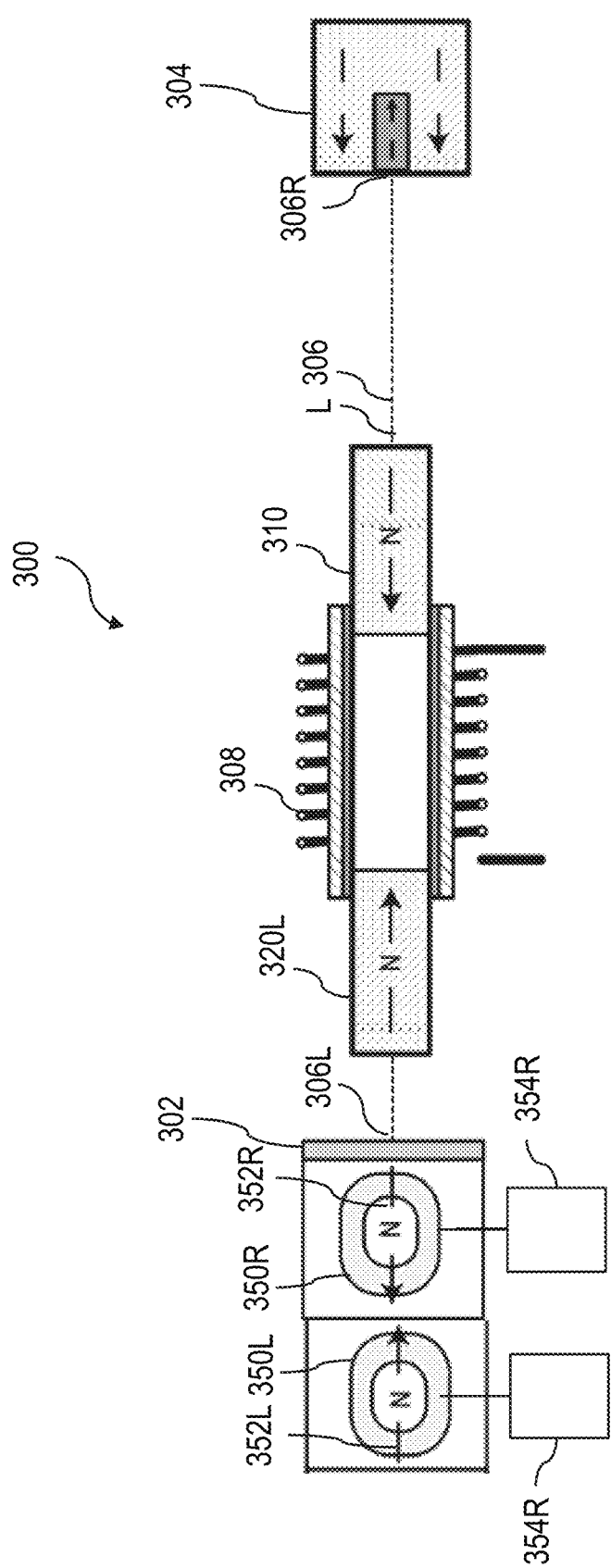
FIG. 8 is a top plan view of another example of the tactile feedback actuator of FIG. 1, showing two electropermanent magnets at one end of a hammer path of the tactile feedback actuator, in accordance with an embodiment.

FIG. 8 shows another example of an actuator 300, in accordance with another embodiment. As illustrated in this example, the actuator 300 has a hammer path 306 having a length L extending between first and second ends 306L, 306R of the hammer path 306, a first electropermanent magnet 350L at the first end 306L and a second electropermanent magnet 350R also at the first end 306R, and a damper 304 at the second end 306R.

As shown, the first and second electropermanent magnets 350L,350R have magnetization directions 352L,352R which are aligned with the length L of the hammer path 306. In this example, the first electropermanent magnet 350L is configured to as to attract the permanent magnet 320L of the magnetic hammer 310 when the first electropermanent magnet 350L is the magnetized state. In contrast, the second electropermanent magnet 350R is configured to as to repel the permanent magnet 320L of the magnetic hammer 310 when the second electropermanent magnet 350R is the magnetized state. The magnetization directions of the first and second electropermanent magnets 350L,350R are thus opposite.

In this example, to toggle the state of the first electropermanent magnet 350L, a first state toggling device 354L is provided. Similarly, a second state toggling device 354R is provided to toggle the state of the second electropermanent magnet 350R. In this example, the first and second state toggling devices 354L and 354R are independent from one another. Accordingly, the states of the first and second electropermanent magnets 350L and 350R can be controlled in an independent manner. However, in alternate embodiments, the states of the first and second electropermanent magnets 350L and 350R can be controlled using a single state toggling device.

Having a combination of two or more electropermanent magnets at a single end of the hammer path 306 can allow generation of different types haptic effects and/or haptic effect of different strengths.

For instance, a first haptic effect can be produced upon deceleration of the magnetic hammer 310 at the first end 306L when the first electropermanent magnet 350L is in the unmagnetized state and when the second electropermanent magnet 350R is in the unmagnetized state. In this particular example, the first haptic effect can be referred to as a click, as the magnetic hammer 310 strikes the stopper 302.

A second haptic effect can be produced upon deceleration of the magnetic hammer 310 at the first end 306L when the first electropermanent magnet 350L is in the magnetized state and when the second electropermanent magnet 350R is in the unmagnetized state. In this case, the magnetic hammer 310 is attracted towards the stopper 302 in addition to being subjected to a magnetic field generated by the coil element 308. Accordingly, the second haptic effect can include a click with a strength greater than a strength of the first haptic effect. Indeed, the strength of the click may be greater, as the magnetic hammer 310 reaches a higher maximum velocity prior to striking the stopper 302, due to the magnetic attraction of the magnetic hammer 310 towards the first electropermanent magnet 350L.

A third haptic effect can be produced upon deceleration of the magnetic hammer 310 at the first end 306L when the first electropermanent magnet 350L is in the magnetized state and when the second electropermanent magnet 350R is in the magnetized state. In this specific combination of states, the first electropermanent magnet 350L attracts the magnetic hammer 310 and the second electropermanent magnet 350R repels the magnetic hammer 310. Accordingly, the third haptic effect can include a thump of a given strength, as the second permanent magnet 350R is closed to the permanent magnet 310 than the first permanent magnet 350L.

A fourth haptic effect can be produced upon deceleration of the magnetic hammer 310 at the first end 306L when the first electropermanent magnet 350L is in the unmagnetized state and when the second electropermanent magnet 350R is in the magnetized state. In this case, the second electropermanent magnet 350R repels the magnetic hammer 310 so a thump can be produced when the magnetic hammer 310 decelerates at the first end 306L. The strength of this fourth haptic effect may be greater than a strength of the third haptic effect, as the first electropermanent magnet 350L is in the unmagnetized state.

Other possible arrangements of the first and second electropermanent magnets 350L, 350R can be used. Indeed, although FIG. 8 shows a SN-NS arrangement, it is believed that other embodiments of such an actuator can have a NS-NS arrangement, a NS-SN arrangement or a SN-SN arrangement. In each of these embodiments, thumps and/or clicks of different strengths can be provided depending on the state of each of the first and second electropermanent magnets.

As can be understood, the examples described above and illustrated are intended to be exemplary only. The scope is indicated by the appended claims.

What is claimed is:

1. A tactile feedback actuator having a hammer path having a length extending between two opposite ends, a coil element fixedly mounted relative to the hammer path, a magnetic hammer guidingly mounted for movement along the hammer path, the magnetic hammer being electromagnetically engageable by a magnetic field emitted upon activation of the coil element so as to be longitudinally slid along the hammer path in any one of two opposite directions depending on a polarity of activation of the coil element, at least one electropermanent magnet at at least one of the opposite ends of the hammer path, the electropermanent magnet having a magnetization direction aligned with the length of the hammer path, and at least one state toggling device configured for toggling a state of the electropermanent magnet between a magnetized state and an unmagnetized state.

2. The tactile feedback actuator of claim 1 wherein the magnetization direction of the electropermanent magnet is directed in a manner that the electropermanent magnet repels the magnetic hammer when in the magnetized state.

3. The tactile feedback actuator of claim 1 further comprising a stopper at the at least one of the opposite ends of the hammer path, between the electropermanent magnet and the magnetic hammer, the magnetic hammer being slidable upon activation of the coil element to strike the stopper when the electropermanent magnet is in the unmagnetized state.

4. The tactile feedback actuator of claim 3 wherein the stopper includes ferromagnetic material, the magnetic hammer being attracted to the ferromagnetic material of the stopper when the coil element is deactivated and when the electropermanent magnet is in the unmagnetized state, to provide a rest position.

5. The tactile feedback actuator of claim 1 wherein the electropermanent magnet delimits the at least one of the opposite ends of the hammer path, the magnetic hammer being slidable upon activation of the coil element to strike the electropermanent magnet when the electropermanent magnet is in the unmagnetized state.

6. The tactile feedback actuator of claim 1 wherein the state toggling device includes a pulse generator electrically connected to a wire winding wrapped around part of the electropermanent magnet, the pulse generator being configured to inject a pulse of current of a given amplitude, duration and polarity in the wire winding in a given direction which causes the state of the electropermanent magnet to be toggled.

7. The tactile feedback actuator of claim 1 wherein the at least one electropermanent magnet is at one of the opposite ends of the hammer path, the tactile feedback actuator further comprising a damper at the other one of the opposite ends of the hammer path.

8. The tactile feedback actuator of claim 1 wherein the at least one electropermanent includes a first electropermanent magnet at one of the opposite ends of the hammer path and a second electropermanent magnet at the other one of the opposite ends of the hammer path.

9. The tactile feedback actuator of claim 8 wherein the at least one state toggling device includes a first state toggling device for toggling a state of the first electropermanent magnet and a second state toggling device for toggling a state of the second electropermanent magnet.

10. The tactile feedback actuator of claim 8 wherein the first electropermanent magnet is directed to repel the magnetic hammer when the first electropermanent magnet is in the magnetized state and the second electropermanent magnet is directed to repel the magnetic hammer when the second electropermanent magnet is in the magnetized state.

11. The tactile feedback actuator of claim 10 wherein the magnetic hammer has two opposite ends, each end of the magnetic hammer having a corresponding permanent magnet, the two permanent magnets having opposing polarities.

12. The tactile feedback actuator of claim 11 wherein, when in their respective magnetized states, each one of the first and second electropermanent magnets has a hammer-repelling pole repelling a proximate one of the permanent magnets of the magnetic hammer.

13. The tactile feedback actuator of claim 1 wherein the at least one electropermanent magnet includes a first electropermanent magnet at one of the opposite ends of the hammer path and a second electropermanent magnet at the same one of the opposite ends of the hammer path, one of the first and second electropermanent magnets being closer to the hammer path than the other one of the first and second electropermanent magnets.

14. The tactile feedback actuator of claim 13 wherein the first electropermanent magnet has a first magnetization direction being opposite to a second magnetization direction of the second electropermanent magnet in a manner that the first electropermanent magnet one of attracts and repels the magnetic hammer when in the magnetized state and that the second electropermanent magnet the other one of attracts and repels the magnetic hammer when in the magnetized state.

15. A method of operating a tactile feedback actuator with a controller, the tactile feedback actuator having a magnetic hammer guidingly mounted for movement along a hammer path, an electropermanent magnet at a first end of the hammer path, and a coil element, the method comprising:
   activating the coil element in a manner that the magnetic hammer is moved in back and forth sequences along the hammer path to produce a first haptic effect when the magnetic hammer is decelerated at the first end; and
   toggling a state of the electropermanent magnet to replace the first haptic effect with a different, second haptic effect, one of the first and second haptic effects including a strike of the magnetic hammer to produce a click.

16. The method of claim 15 wherein said toggling is performed upon receiving a request to transition the tactile feedback actuator between an audible mode and an inaudible mode.

17. The method of claim 15 further comprising retoggling the state of the electropermanent magnet to replace the second haptic effect back to the first haptic effect.

18. The method of claim 15 wherein the tactile feedback actuator further comprises a damper at a second end of the hammer path, said activating the coil element producing a third haptic effect as the magnetic hammer is decelerated at the second end.

19. The method of claim 18 further comprising deactivating the coil element resulting in the magnetic hammer moving towards a rest position provided by the damper along the hammer path.

20. The method of claim 18 wherein when the electropermanent magnet is in the magnetized state, said activating is performed in a manner that the magnetic hammer bounces at the first end due to magnetic repelling between the electropermanent magnet and the magnetic hammer and bounces at the second end due to magnetic repelling between the magnetic hammer and the damper.

21. The method of claim 20 wherein said activating includes activating the coil element so as to drive the magnetic hammer into resonance between the electropermanent magnet and the damper.

\* \* \* \* \*